United States Patent
Naik Raikar et al.

(10) Patent No.: US 11,711,557 B2
(45) Date of Patent: *Jul. 25, 2023

(54) SYSTEMS, METHODS, AND DEVICES SUPPORTING SCENE CHANGE-BASED SMART SEARCH FUNCTIONALITIES

(71) Applicant: SLING MEDIA PVT LTD, Bangaluru (IN)

(72) Inventors: Yatish Jayant Naik Raikar, Bengaluru (IN); Soham Sahabhaumik, Bengaluru (IN); Rakesh Ramesh, Bengaluru (IN); Karthik Mahabaleshwar Hegde, Bengaluru (IN)

(73) Assignee: DISH Network Technologies India Private Limited

(*) Notice: Subject to any disclaimer, the term of this patent is extended or adjusted under 35 U.S.C. 154(b) by 0 days.

This patent is subject to a terminal disclaimer.

(21) Appl. No.: 17/134,829

(22) Filed: Dec. 28, 2020

(65) Prior Publication Data
US 2021/0120282 A1 Apr. 22, 2021

Related U.S. Application Data

(63) Continuation-in-part of application No. 16/237,389, filed on Dec. 31, 2018, now Pat. No. 10,911,835.

(51) Int. Cl.
*H04N 21/2387* (2011.01)
*H04N 21/239* (2011.01)
*G06V 20/40* (2022.01)

(52) U.S. Cl.
CPC ........ *H04N 21/2387* (2013.01); *G06V 20/46* (2022.01); *H04N 21/2393* (2013.01)

(58) Field of Classification Search
CPC .......... H04N 21/2387; H04N 21/2393; H04N 21/4325; H04N 21/47217; H04N 21/44008; G06K 9/00744; G06K 9/00751
(Continued)

(56) References Cited

U.S. PATENT DOCUMENTS 6,591,058 B1 * 7/2003 O'Connor ............ G11B 27/034
386/248
6,897,894 B1 * 5/2005 Miyazawa ............... H04N 5/76
348/231.8

(Continued)

*Primary Examiner* — Loi H Tran
(74) *Attorney, Agent, or Firm* — KW Law, LLP

(57) ABSTRACT

Systems, methods, and devices are disclosed enabling smart search functionalities utilizing key scene changes appearing in video content. In various embodiments, the method includes the step or process of, while engaged in playback of the video content, receiving a user command at a playback device to shift a current playback position of the video content to a default search playback position ($PP_{DS}$). In response to receipt of the user command, the playback device searches a time window encompassing the default search playback position ($PP_{DS}$) for a key scene change in the video content. If locating a key scene change within the time window, the playback device shifts playback of the video content to a playback position corresponding to the key scene change ($PP_{ST}$). Otherwise, the playback device shifts playback of the video content to the default search playback position ($PP_{DS}$).

20 Claims, 4 Drawing Sheets

(58) Field of Classification Search
USPC .......................................................... 386/241
See application file for complete search history.

(56) References Cited

U.S. PATENT DOCUMENTS

| | | | | |
|---|---|---|---|---|
| 8,875,023 | B2* | 10/2014 | Cronin | .................. G06F 3/0484 |
| | | | | 715/722 |
| 2006/0085814 | A1* | 4/2006 | Okamoto | ......... G11B 20/00746 |
| | | | | 386/E5.052 |
| 2007/0031119 | A1* | 2/2007 | Iwanaga | ................ G11B 27/28 |
| | | | | 386/241 |
| 2007/0150462 | A1* | 6/2007 | Nonaka | .................. H04N 21/84 |
| 2009/0207316 | A1* | 8/2009 | Cupal | .................... G11B 27/28 |
| | | | | 348/700 |
| 2010/0172627 | A1* | 7/2010 | Ohki | .................. H04N 21/4334 |
| | | | | 386/343 |
| 2016/0104045 | A1* | 4/2016 | Cho | ..................... G11B 27/031 |
| | | | | 386/223 |
| 2017/0052695 | A1* | 2/2017 | Lee | ........................ G06F 3/0488 |
| 2019/0320219 | A1* | 10/2019 | Yoden | ............. H04N 21/43615 |
| 2020/0033144 | A1* | 1/2020 | Du | ..................... G01C 21/3484 |

* cited by examiner

SYSTEMS, METHODS, AND DEVICES SUPPORTING SCENE CHANGE-BASED SMART SEARCH FUNCTIONALITIES

CROSS-REFERENCE TO RELATED APPLICATIONS

This application is a continuation of the parent U.S. patent application Ser. No. 16/237,389 (U.S. Pat. No. 10,911,835), filed on Dec. 31, 2018, the content of which is hereby incorporated by reference in its entirety.

TECHNICAL FIELD

The following disclosure generally relates to video content viewing and, more particularly, to systems, methods, and devices enabling smart search (SKIP and/or SEEK) functionalities utilizing key scene changes in video content.

Abbreviations

Abbreviations appearing less frequently in this document are defined upon initial usage, while abbreviations appearing with greater frequency are defined below.
CDN—Content Delivery Network;
DVR—Digital Video Recorder;
GUI—Graphical User Interface;
OTT—Over-The-Top;
STB—Set-Top Box; and
VOD—Video-On-Demand.

BACKGROUND

Video content, including VOD and TV programming, has traditionally been delivered to viewers over legacy cable and satellite broadcast systems. More recently, various streaming video platforms have been introduced by video content providers and gained widespread commercial adoption; the term "video content provider," as appearing herein, encompassing all types of video content sources, aggregators, and the like from which content-containing digital or analog signals can be obtained for viewing on user devices. The term "video content providers" thus encompasses cable, satellite, and OTT TV providers, as well as entities owning or operating streaming video platforms. It is also now commonplace for end users to place-shift video content stored in memory contained in or accessible to a home media receiver, such as an STB located at the end user's residence, over a network for viewing on a smartphone, tablet, or other portable media receiver operated by the end user.

Modern user interfaces enable users to search for a desired "playback position" in video content utilizing SKIP and SEEK functionalities; also referred to as "SKIP" and "SEEK," respectively, and jointly referred to as "search functions" herein. Generally, SKIP allows a user to shift the current playback position of video content, in either a forward or backward time direction, by a fixed period of time on the order of, for example, 10 seconds. Comparatively, SEEK typically allows a user to play video content utilizing a so-called "trick mode" functionality at an increased playback rate, such 2×, 4×, 8×, or 16× the default or normal (1×) playback speed, in either a forward or backward time direction. Alternatively, in more modern GUIs offered by YOUTUBE® and other VOD platforms, SEEK may be carried-out utilizing an interactive graphic in the form of a slide bar. In such instances, a user may SEEK desired content by dragging a slide bar widget or bug to a desired position along the length of a slide bar, which is representative of the duration of the video content.

As traditionally implemented, SKIP and SEEK functionalities may be undesirably cumbersome when a user attempts to locate a desired point-of-interest in video content, such as the beginning of a particular scene. For example, when utilizing the SKIP functionality, it is common for a user to inadvertently advance the playback position beyond a desired scene change or other point-of-interest. Similarly, in the case of trick mode-based SEEK functionalities, a user is generally required to pay exceedingly close attention to the displayed video content to identify a scene change or other point-of-interest when engaged in variable speed seeking. It is thus common for a user to inadvertently advance the playback position beyond a desired scene change, thereby requiring the user to briefly reverse the trick mode (e.g., rewind after fast forwarding) to ultimately arrive at the desired playback position.

Finally, while generally affording better user control in locating points-of-interest in video content, slide bar-based SEEK functionalities are also associated with limitations. For example, slide bar accuracy is often dependent upon the length of a given video content item and display area size in which the video content is presented. Consequently, for video content having longer durations or presented in smaller display areas, a loss of granularity occurs when utilizing the slide bar widget to seek-out desired points-of-interest in video content. Thumbnail images may be usefully presented alongside the slide bar to assist in searching in certain instances; however, this typically requires a user to pay close attention to the thumbnail imagery, which may be relatively small in size particularly when produced on a smartphone or other display device having a relatively small display screen. Other applications offering slide bar-based SEEK functionalities forego the generation of thumbnail images, in which case locating a desired playback position in video content utilizing the SEEK functionality can become a frustrating exercise in trial-and-error.

BRIEF SUMMARY

Methods are disclosed enabling smart search functionalities for locating points-of-interest in video content utilizing key scene changes. The scene change-based search functionalities can include SKIP functions, SEEK functions, or a combination thereof. The method may be carried-out utilizing a playback device, which receives video content for presentation to an end user via a display device included in or operably coupled to the playback device. In various embodiments, the method includes the step or process of, while engaged in playback of the video content, receiving a user command at the playback device to shift a current playback position of the video content to a default search playback position ($PP_{DS}$). In response to receipt of the user command, the playback device searches a time window encompassing the default search playback position ($PP_{DS}$) for a key scene change in the video content. If a key scene change is located within the time window, the playback device shifts playback of the video content to a playback position corresponding to the key scene change ($PP_{ST}$). If, instead, not locating a key scene change in the time window, the playback device shifts playback of the video content to the default search playback position ($PP_{DS}$).

Continuing the description from the previous paragraph, embodiments of the method may further include the steps or processes of, prior to searching the time window, determining: (i) a start time ($W_S$) of the time window occurring X seconds prior to the default search playback position ($PP_{DS}$), and an end time ($W_E$) of the time window occurring Y seconds following the default search playback position ($PP_{DS}$). In certain cases, X and Y may be assigned predetermined values such that 2 seconds<X+Y<20 seconds. In other instances in which the user command comprises instructions to implement a SEEK function having a trick mode speed, the method may further include the step or process of determining the values of X and Y based, at least in part, on the trick mode speed of the SEEK function. In further embodiments, method may further include place-shifting the video content from the playback device, over a network, and to a second device coupled to the display device. In such embodiments, the user command is entered at the second device and sent as a user command message transmitted from the second device, over the network, and to the playback device. Also, in such embodiments, the method may further include the step or process of extracting the start time ($W_S$) of the time window and the end time ($W_E$) of the time window from the user command message.

Systems and playback devices are further disclosed enabling such smart, scene change-based search functionalities. In embodiments, a playback device includes a processor and a computer-readable storage medium storing computer-readable code or instructions. When executed by the processor, the computer-readable code causes the playback device to perform the operation of receiving a user command at the playback device to shift a current playback position of the video content to a default search playback position ($PP_{DS}$), while engaged in playback of the video content. In response to receipt of the user command, the playback device searches or scans a time window encompassing the default search playback position ($PP_{DS}$) for a key scene change in the video content. If locating a key scene change within the time window, the playback device shifts or advances playback of the video content to a playback position corresponding to the key scene change ($PP_{ST}$). Conversely, if not locating a key scene change in the time window, the playback device shifts playback of the video content to the default search playback position ($PP_{DS}$).

In further embodiments, the playback device includes a scene change detection module and a smart search module. The scene-based detection module is configured to detect or identify key scene changes in video content and generate corresponding scene change data specifying locations of the key scene changes in the video content. Comparatively, the smart search module is configured to monitor for a user command to shift a current playback position of the video content to a default search playback position ($PP_{DS}$). In response to receipt of the user command, the smart search module utilizes the scene change data to determine if a key scene change occurs (or, perhaps, multiple scene changes occur) within a time window encompassing the default search playback position ($PP_{DS}$). If determining that a key scene change occurs within the time window, the smart search module then shifts or advances playback of the video content to a playback position corresponding to the key scene change ($PP_{ST}$). If instead determining that a key scene change does not occur within the time window, the smart search module shifts playback of the video content to the default search playback position ($PP_{DS}$).

The methods described above and described elsewhere in this document can be implemented utilizing complementary program products, such as software applications executed on suitably-equipped playback devices. Various additional examples, aspects, and other useful features of embodiments of the present disclosure will also become apparent to one of ordinary skill in the relevant industry given the additional description provided below.

BRIEF DESCRIPTION OF THE DRAWING FIGURES

Exemplary embodiments will hereinafter be described in conjunction with the following drawing figures, wherein like numerals denote like elements, and:

Figure 3:
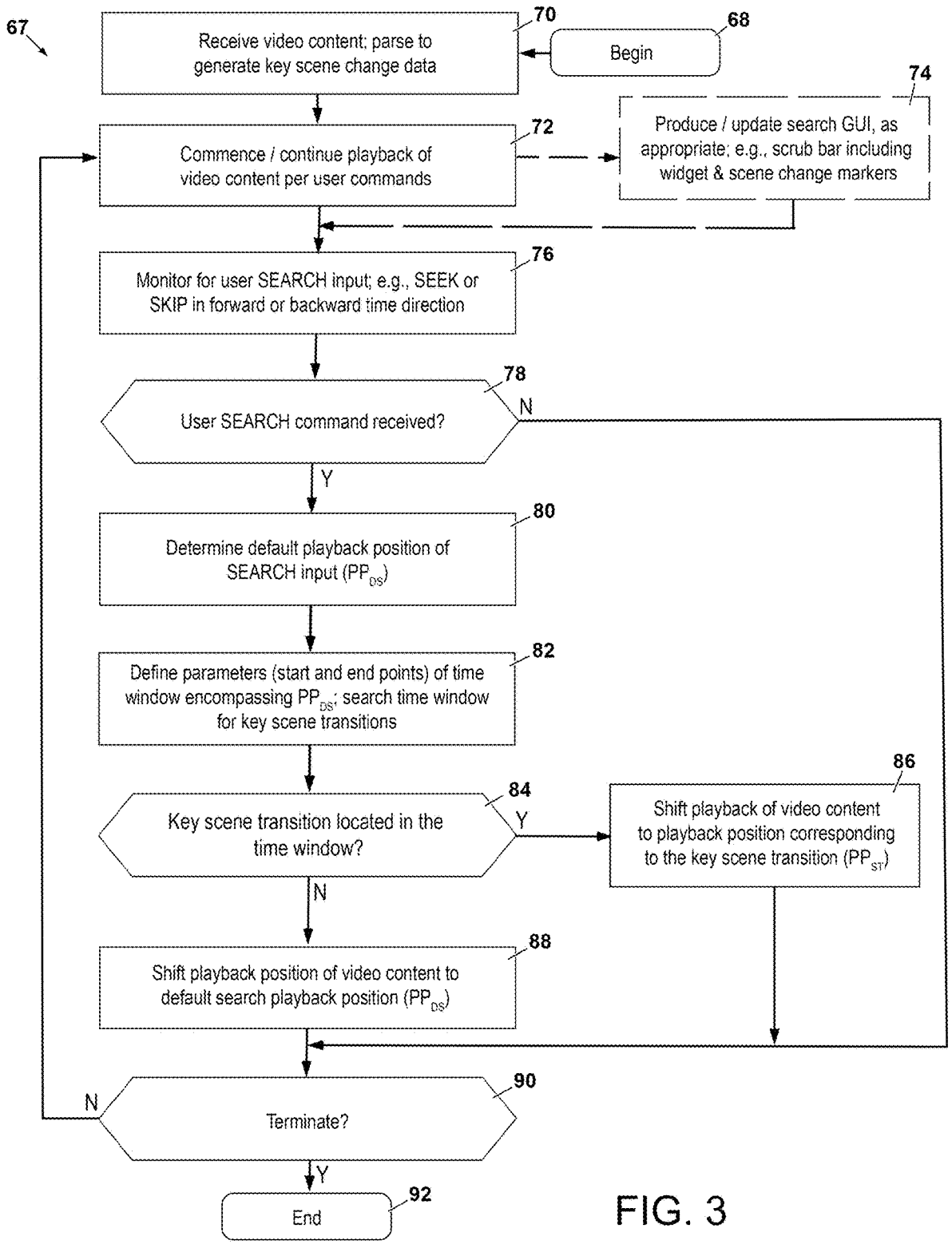
Figure 4:
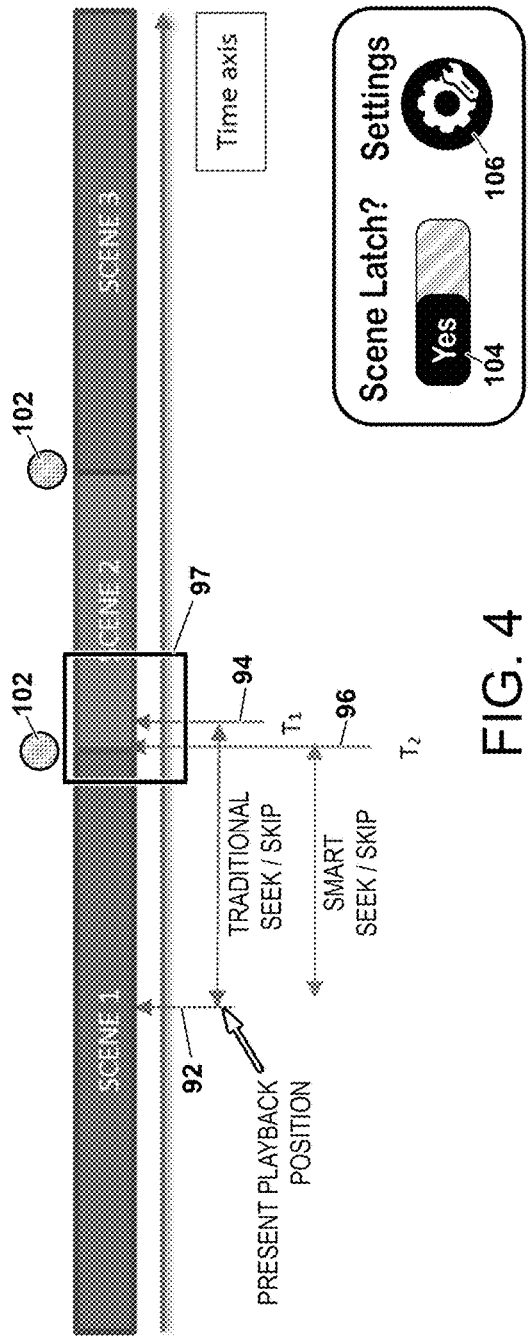
Figure 5:
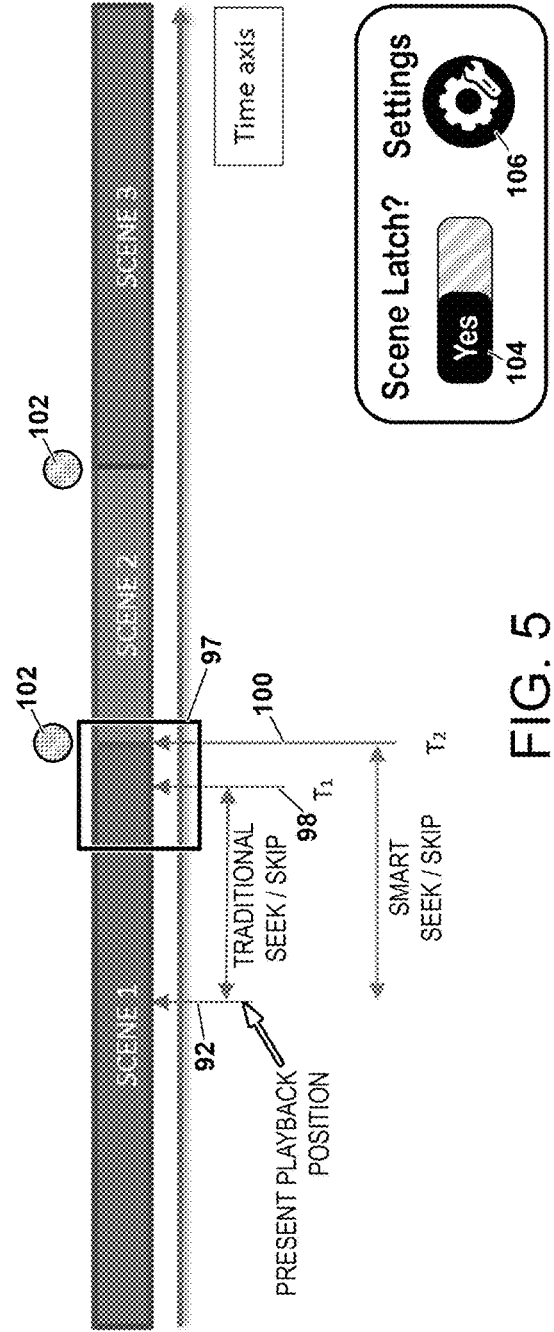

FIG. 3 is a flowchart of a method for implementing smart, scene change-based search functionalities, as illustrated in accordance with an exemplary embodiment of the present disclosure; and FIGS. 4 and 5 illustrate two exemplary scenarios in which playback of video content is shifted (in either a forward or backward time direction) to a key scene change in response to user input and in accordance with the scene change-based search method of FIG. 3.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect.

Overview

Systems, methods, and devices are provided supporting smart search (SKIP and/or SEEK) functionalities utilizing key scene transitions or changes in video content. Generally, the systems, methods, and devices described herein improve the accuracy and ease with which users locate points-of-interest in video content by predicting user desires or points-of-interest corresponding to key scene changes appearing in the video content. Embodiments of the present disclosure may be implemented utilizing a computer-executed algorithm or process, which detects when an end user utilizes a particular search command (e.g., a SKIP or SEEK function) to change a current playback position of video content. When determining that a user has initiated such a search command, the playback device searches for key scene changes occurring within a time window encompassing a default playback position corresponding to the user-entered search command. If a key scene change is located within this time window, the playback device predicts a likely user intent to shift playback of the video content to a time position corresponding to the key scene change (herein "$PP_{ST}$"); or, if multiple key scene changes are located within the time window, to a time position corresponding to the key scene change occurring most closely in time to $PP_{DS}$. In accordance with this prediction, the playback device then shifts playback of the video content to the playback position corresponding to the key scene change ($PP_{ST}$) as opposed to the default search playback position ($PP_{DS}$). Otherwise, the playback device shifts playback of the video content to the default search playback position ($PP_{DS}$).

By predicting user desires in the above-described manner, embodiments of the disclosure provide an efficient scheme to better enable users to navigate through video content. Further, little, if any additional effort or learning is required on behalf of the end user in executing the smart search functions. The smart search functionalities outlined above can be modified in further embodiments and can include other functionalities, such as actively varying parameters defining the time window based upon one or more factors. Additional description in this regard is provided below in connection with FIGS. 2-5. First, however, a general description of media system including playback devices suitable for carrying-out embodiments of the present disclosure will be described in conjunction with FIG. 1.

Figure 1:
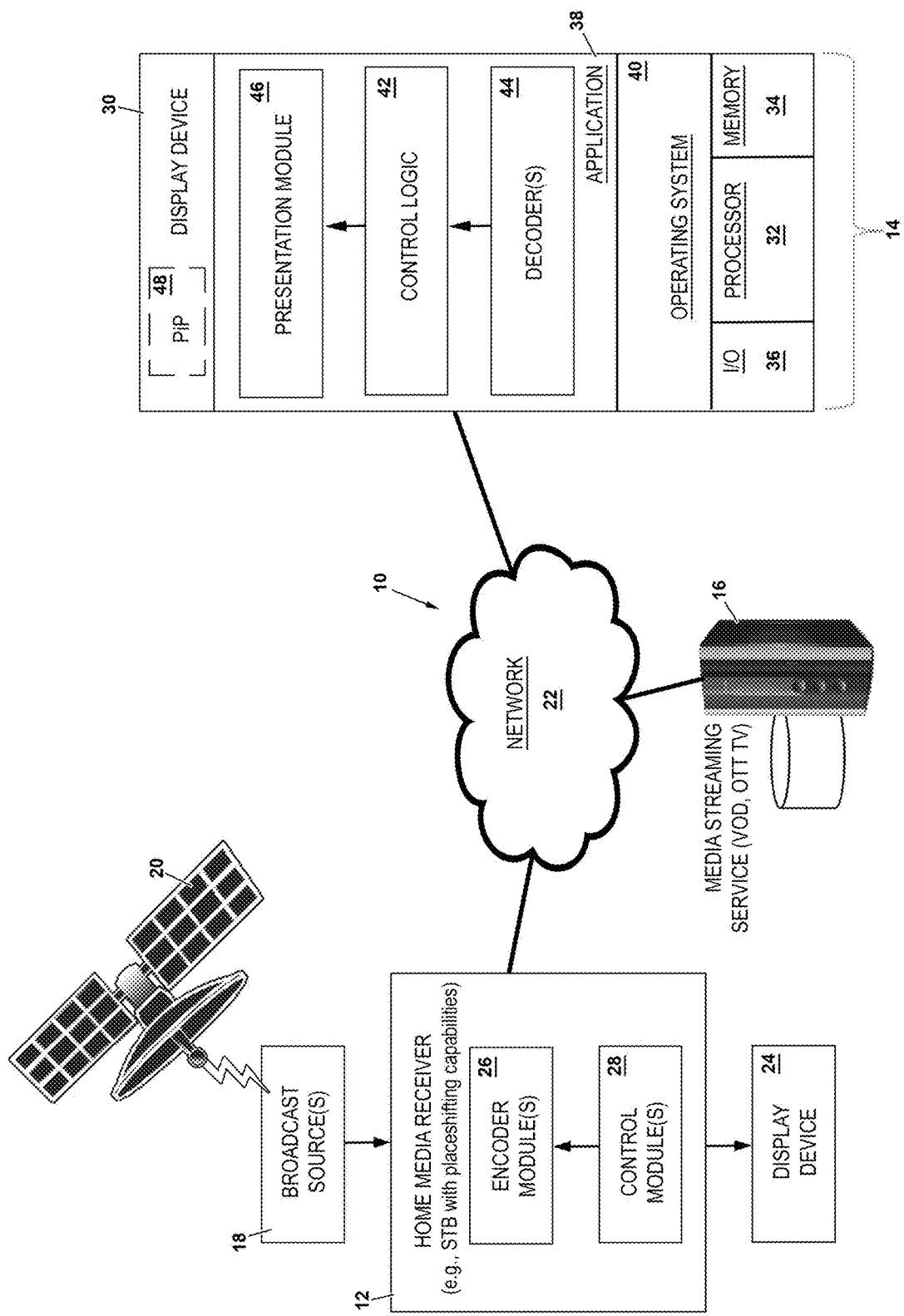
FIG. 1 is a schematic of a media transmission system including two playback devices (e.g., a portable media receiver and a home media receiver) suitable for performing embodiments of the present disclosure.

Example of Streaming Media System Including Playback Devices Suitable for Performing Embodiments of the Present Disclosure FIG. 1 schematically illustrates a media transmission architecture or system 10 including two playback devices (e.g., receivers 12, 14 below) suitable for carrying-out embodiments of the present disclosure, as depicted in accordance with an embodiment of the present disclosure. In the illustrated example, system 10 includes a home media receiver 12 (which may also operate as a streaming server or place-shifting device in certain embodiments), a user-carried or portable media receiver 14, and at least one commercial media streaming service 16. Home media receiver 12 may assume the form of an STB or a similar electronic device, which receives video content from one or more broadcast sources or video content providers 18. For example, as indicated in FIG. 1, broadcast sources/content providers 18 may include a satellite 20, which provides a feed received by a non-illustrated satellite antenna further included in sources 18 and supplied to home media receiver 12. Additionally or alternatively, broadcast sources 18 may include cable TV delivery means, such as optical fiber or co-axial cable; and/or delivery of OTT TV through a data transmission network 22, such as the Internet. In still further embodiments, home media receiver 12 may receive video content transmitted over network 22 and provided by, for example, media streaming (e.g., VOD) service 16 or another place-shifting device (not shown). Home media receiver 12 may receive, decode, and generate output signals for such video content, which may then be presented on a display device 24 (e.g., a home television or monitor) for viewing by an end user.

In contrast to home media receiver 12, portable media receiver 14 may be any portable electronic device capable of receiving streaming video content over network 22. In certain embodiments, receivers 12, 14 may communicate over network 22, with home media receiver 12 serving as a place-shifting device providing streaming content to portable media receiver 14. In such implementations, home media receiver 12 (e.g., an STB located in a user's residence) may transmit streaming video content to portable media receiver 14 (e.g., a smartphone or tablet) for viewing by an end user. In such embodiments, home media receiver 12 may be considered a playback device, while receiver 14 is considered a second device coupled to a display screen on which the steamed video content is presented. In other instances, video content may be stored in and played from a local memory accessible to portable media receiver 14, whether an internal memory contained in the housing of receiver 14 or an external memory exterior to the receiver housing and coupled to receiver 14 through, for example, a USB (or other) connection.

Video content may be initially recorded or stored in a memory accessible to home media receiver 12; e.g., a computer-readable storage area contained in receiver 12 or an external memory coupled to receiver 12 via a wired or wireless (home network) connection. Alternatively, the pertinent video content may be transmitted to home media receiver 12 and then place-shifted to portable media receiver 14 by receiver 12 as the content is received. When providing such a place-shifting functionality, home media receiver 12 may further contain at least one encoder module 26 and control module 28. Modules 26, 28 can be implemented utilizing software, hardware, firmware, and combinations thereof. The encoded media stream generated by receiver 12 will typically contain both video and audio component streams, which may be combined with packet identification data. Any currently-known or later-developed packetized format can be employed by receiver 12 including, but not limited to, MPEG, QUICKTIME, WINDOWS MEDIA, and/or other formats suitable for streaming transmission over network 22.

The foregoing components can each be implemented utilizing any suitable number and combination of known devices including microprocessors, memories, power supplies, storage devices, interface cards, and other standardized components. Such components may include or cooperate with any number of software programs or instructions designed to carry-out the various methods, process tasks, encoding and decoding algorithms, and relevant display functions. Media transmission system 10 may also include various other conventionally-known components, which are operably interconnected (e.g., through network 22) and not shown in FIG. 1 to avoid unnecessarily obscuring the drawing. Network 22 may encompass any number of digital or other networks enabling communication between receiver 12, receiver 14, and/or media streaming service 16 utilizing common protocols and signaling schemes. In this regard, network 22 can include one or more open CDNs, Virtual Private Networks (VPNs), the Internet, and various other networks implemented in accordance with TCP/IP protocol systems or other conventional protocols. Network 22 may also encompass one or more wired or Local Area Networks (LANS), Wide Area Networks (WANs), a cellular network, and/or any other pubic or private networks.

As indicated above, portable media receiver 14 can assume the form of any electronic device suitable for performing the processes and functions described herein. A non-exhaustive list of suitable electronic devices includes smartphones, wearable devices, tablet devices, laptop computers, and desktop computers. When engaged in a place-shifting session with home media receiver 12, portable media receiver 14 outputs visual signals for presentation on display device 30. Display device 30 can be integrated into portable media receiver 14 as a unitary system or electronic device. This may be the case when, for example, portable media receiver 14 assumes the form of a mobile phone, tablet, laptop computer, or similar electronic device having a dedicated display screen. Alternatively, display device 30 can assume the form of an independent device, such as a freestanding monitor or television set, which is connected to portable media receiver 14 via a wired or wireless connection. Any such video output signals may be formatted in accordance with conventionally-known standards, such as S-video, High Definition Multimedia Interface (HDMI), Sony/Philips Display Interface Format (SPDIF), DVI (Digital Video Interface), or IEEE 1394 standards, as appropriate.

By way of non-limiting illustration, portable media receiver 14 is shown in FIG. 1 as containing at least one processor 32, an associated memory 34, and a number of I/O features 36. I/O features 36 can include various different types of interfaces, such as a network interface, an interface to mass storage, an interface to display device 30, and any number of user input interfaces. Portable media receiver 14 may execute a software program or browser player 38 directing the various hardware features of portable media receiver 14 to perform the functions described herein. Browser player 38 suitably interfaces with processor 32, memory 34, and I/O features 36 via any conventional operating system 40 to provide such functionalities. Software application can be place-shifting application in embodiments in which home media receiver 12 assumes the form of a STB, DVR, or similar electronic device having place-shifting capabilities. In such embodiments, home media receiver 12 will typically be located within the residence of the end user, although this not strictly necessary. In certain realizations, portable media receiver 14 may be implemented utilizing special-purpose hardware or software, such as the SLINGBOX-brand products available from SLING MEDIA INC. currently headquartered in Foster City, Calif.

Browser player 38 includes control logic 42 adapted to process user input, obtain streaming content from one or more content sources, decode received content streams, and provide corresponding output signals to display device 30. In this regard, control logic 42 may establish a data sharing connection with the remote home media receiver 12 enabling wireless bidirectional communication with control module 28 such that a place-shifting session can be established and maintained. During a place-shifting session, home media receiver 12 streams place-shifted content to portable media receiver 14 over network 22. Such streaming content can contain any visual or audiovisual programming including, but not limited to, streaming OTT TV programming and VOD content. The streaming content is received by portable media receiver 14 and decoded by decoding module 44, which may be implemented in hardware or software executing on processor 32. The decoded programming is then provided to a presentation module 46, which generates output signals to display device 30 for presentation to the end user operating portable media receiver 14. In some embodiments, presentation module 46 may combine decoded programming (e.g., programming from multiple streaming channels) to create a blended or composite image; e.g., as schematically indicated in FIG. 1, one or more Picture-in-Picture (PiP) images 48 may be superimposed over a main or primary image generated on a screen of display device 30.

In operation, control logic 42 of portable media receiver 14 obtains programming in response to end user input or commands received via a user interface, such as a touchscreen or keyboard interface, included within I/O features 36. Control logic 42 may establish a control connection with remotely-located home media receiver 12 via network 22 enabling the transmission of commands from control logic 42 to control module 28. Accordingly, home media receiver 12 may operate by responding to commands received from a portable media receiver 14 via network 22. Such commands may include information utilized to initiate a place-shifting session with home media receiver 12, such as data supporting mutual authentication of home media receiver 12 and portable media receiver 14. In embodiments in which home media receiver 12 assumes the form of a consumer place-shifting device, such as an STB or DVR located in an end user's residence, control commands may include instructions to remotely operate home media receiver 12 as appropriate to support the current place-shifting session.

Figure 2:
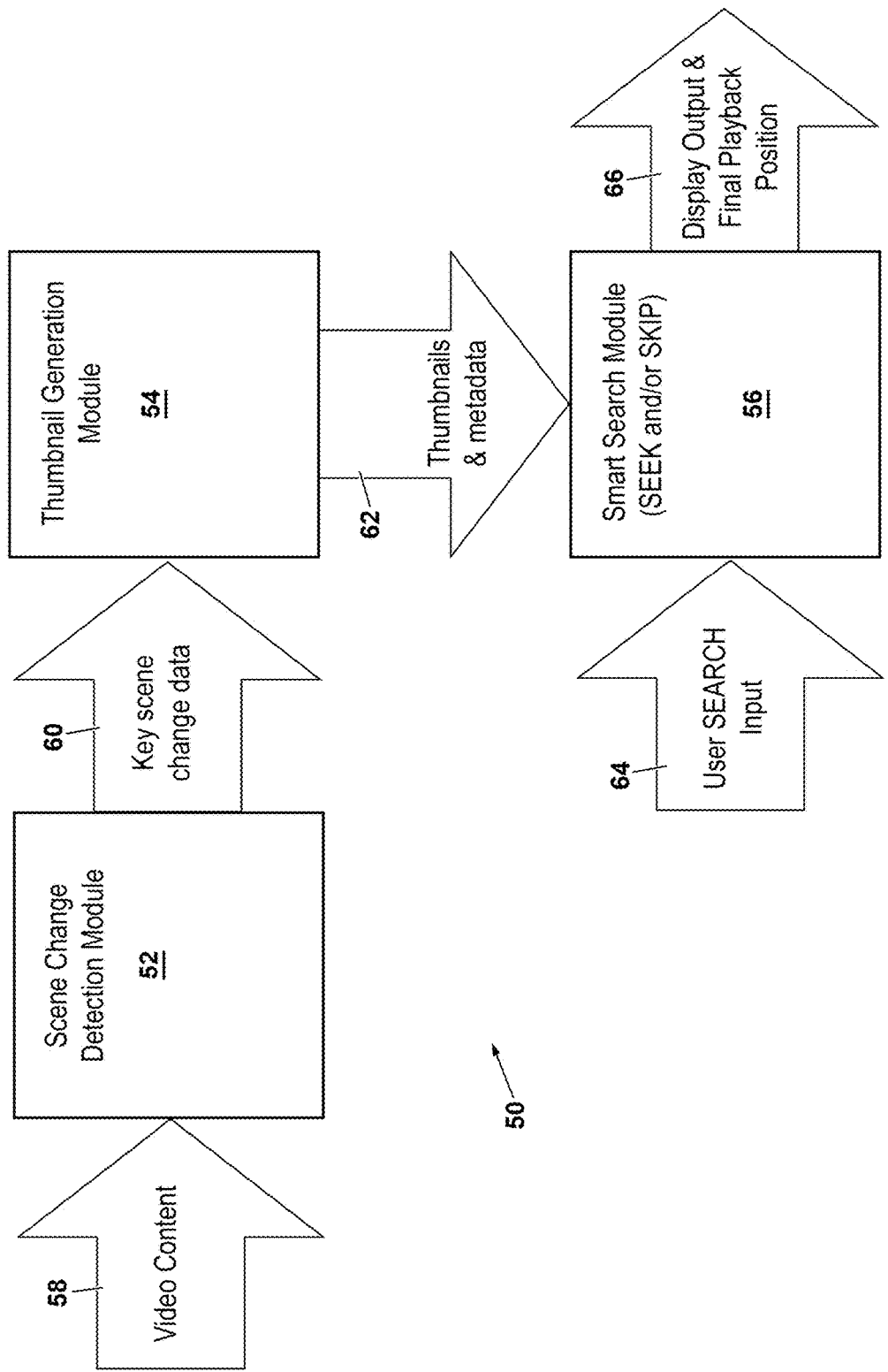
FIG. 2 is a diagram illustrating an exemplary architecture suitably included in either or both of the playback devices shown in FIG. 1 and operable to carry-out embodiments of the smart, scene change-based search functionalities (SKIP and/or SEEK) described herein.

FIG. 2 illustrates an exemplary playback device architecture 50, which may be incorporated into either or both of receivers 12, 14 shown in FIG. 1 and utilized to perform the smart, scene change-based search functionalities in certain embodiments of the present disclosure. In the illustrated example, playback device architecture 50 includes three operably-interconnected modules: a scene change detection module 52, a thumbnail generation module 54, and a smart search module 56. As previously indicated, modules 52, 54, 56 can be implemented utilizing any combination of hardware, software, and firmware residing within receiver 12 and/or receiver 14. Modules 52, 54, 56 may be combined in the form of common hardware or software in certain instances, but are depicted as separate blocks in FIG. 2 for illustrative clarity.

As indicated in FIG. 2 by arrow 58, video content may be provided to scene change detection module 52 as input. This video content may be stored in a local memory accessible to playback device architecture 50 (e.g., memory 34 shown in FIG. 1), received from a suitable broadcast source (e.g., one of broadcast sources 18 shown in FIG. 1), streamed from playback device architecture 50 (e.g., in the form of receiver 12) to a second device (e.g., receiver 14) over a network (e.g., network 22), or otherwise obtained. Scene change detection module 52 then parses the received video content to locate key scene changes occurring in the video content. Scene change detection module 52 may utilize any process or technique capable of locating such key scene changes in the video content. For example, in certain instances, flags or other computer-readable markers may be embedded in video input 58; e.g., as created by manual editing of the video. In such instances, scene change detection module 52 may utilize the embedded markers to identify the locations of key scene changes. In other embodiments, scene change detection module 52 may utilize accompanying audio information, closed captioning data, or image processing to detect key scene changes in the video content.

Scene change detection module 52 may parse the entirety of video content 58 ahead of the below-described process, which case key scene change data 60 may be provided as a single manifest to thumbnail generation module 54 when appropriate. Alternatively, scene change detection module 52 may repeatedly parse sections (e.g., successive segments of a predetermine duration) of the video content during playback, while providing key scene change data 60 for each parsed section of the video content after processing by module 52. Notably, scene change detection module 52 may not identify every scene changes appearing in the video content as a "key" scene change. Instead, in embodiments, scene change detection module 52 may determine whether a scene change is considered a "key" scene changes utilizing additional data, such as user preference data contained in a user profile, as discussed more fully below. Scene change detection module 52 then provides the key scene change data as an output 60, which is forwarded to thumbnail generation module 54.

When included in playback device architecture 50, thumbnail generation module 54 receives the key scene change data provided by scene change detection module 52 as input 60. Thumbnail generation module 54 utilizes the key scene change data to ensure that a thumbnail image is generated for each key scene change in the video content. In this regard, thumbnail generation module 54 may generate thumbnail images for the video content at predetermined intervals as a baseline set of images; e.g., module 54 may generate a thumbnail image every N seconds progressing through the entire duration of a given video content item. Additionally, thumbnail generation module 54 may further generate thumbnail images for each time point corresponding to a key scene change, as specified in the key scene change data provided by module 52. Thumbnail generation module 54 may then consolidate these two sets of images to yield a final set of thumbnail images. In so doing, module 54 may also replace any baseline thumbnail image with a key scene change thumbnail image occurring within a predetermine time proximity (e.g., a four second time span) of the key scene change thumbnail image to avoid redundancy of images. The final set of thumbnail images may then be stored in local memory accessible by smart search module 56 or otherwise provided to module 56 as output 62. The final thumbnails may be stored for subsequent access by smart search module 56 or, instead, immediately outputted to smart search module 56 along with corresponding metadata (e.g., specifying the time position corresponding to each thumbnail) to enhance the accuracy of the smart search process conducted by module 56. This example notwithstanding, thumbnail generation module 54 may be omitted in further embodiments; e.g., in embodiments which the on-screen imagery generated in conjunction with the search process does not include thumbnail images or when on-screen imagery is not generated in conjunction with the search process.

With continued reference to FIG. 2, smart search module 56 receives user search commands when entered by a user operating the playback device (arrow 64). Smart search module 56 then determines a default search playback position ($PP_{DS}$) requested by the search command. Utilizing the data provided by scene change detection module 52 and/or thumbnail generation module 54, smart search module 56 searches a time window encompassing the default search playback position ($PP_{DS}$) for key scene changes in the video content. In one approach, smart search module 56 may determine: (i) a start time for the search window ($W_S$) occurring X seconds prior to the default search playback position ($PP_{DS}$), and (ii) an end time for the search window ($W_E$) occurring Y seconds after the default search playback position ($PP_{DS}$). In certain instances, X and Y may each range from 1 to 10 seconds; preferably may each range from 1 to 5 seconds; and more preferably may each be equal to about 2±1 second in embodiments. In other instances, the sum of X and Y may be greater than 2 seconds and less than 20 seconds such that the following equation applies: 2 seconds<X+Y<20 seconds. X and Y will often have equivalent values; however, this need not always be the case. The values of X and Y may be static and, thus, may not vary between different iterations of the smart search. In other instances, however, the values of X and Y may vary based upon a number of factors, such as information pertaining to the user search commands and efforts, as further discussed below in connection with FIG. 3.

After establishing the parameters of the time window to search, smart search module 56 next scans the segment of the video content encompassed by the time window for key scene changes. In the illustrated embodiment, smart search module 56 may perform this task utilizing the key scene change data or manifest generated by scene change detection module 52. For example, in the key scene change data is provided as listing of time points at which key scene changes occur, smart search module 56 may determine which, if any time points fall within the time window. As a relatively simple example, if the time window is determined to have a duration of ±2 seconds (e.g., X and Y each have a value of 2 seconds), and if it is further determined that the default search playback position ($PP_{DS}$) occurs at a certain point during playback (e.g., 10 minutes from the beginning of the window content), smart search module 56 may examine the key scene change data to determine if any scene change time points occur between 10 minutes±2 seconds in the video content.

If a time point corresponding to a key scene change is discovered by module 56 within the time window, as determined utilized the key scene change data, playback of the video content may then be advanced (in either a forward or backward time direction) to this time point. Otherwise, playback of the video content may be shifted the default search playback position ($PP_{DS}$). Further description in this regard is provided below in connection with FIG. 3. Smart search module 56 thus determines the final playback position to which the video content should be shifted or advanced, and provides output 66 indicative of this playback position. Additionally, as indicated in FIG. 2, smart search module 56 may also output any graphics associated with the smart search operation, such as slide bar graphics, key scene change markers, thumbnail imagery, and/or other interactive widgets utilized to control or adjust the setting of the scene change-based smart search process, as discussed more fully below in conjunction with FIGS. 4 and 5.

Turning next to FIG. 3, a flowchart is presented of an exemplary smart, scene change-based search method 67. Embodiments of method 67 can be carried-out by various different types of playback devices, such as either or both of receivers 12, 14 shown in FIG. 1. As illustrated in FIG. 3, method 67 includes a number of process steps identified as STEPS 68, 70, 72, 74, 76, 78, 80, 82, 84, 86, 88, 90, 92. Depending upon the particular manner in which smart, scene change-based search method 67 is implemented, each process step generally illustrated in FIG. 3 may entail a single computer-implemented process or multiple sub-processes. Further, the steps illustrated in FIG. 3 and described below are provided by way of non-limiting example only. In alternative embodiments of search method 67, additional process steps may be performed, certain steps may be omitted, and/or the illustrated steps may be performed in alternative sequences.

After commencing (STEP 68), scene change-based search method 67 advances to STEP 70. During STEP 70, video content is received at the playback device. At an appropriate juncture, playback of the video content may be initiated in accordance with user commands. The video content may be obtained from local memory of the playback device, streamed to the playback device from a streaming media server, place-shifted from a first playback device to a second playback device, or otherwise obtained. Also, at STEP 70 of method 67, the video content is parsed to identify key scene changes; e.g., by scene change detection module 52 utilizing any one of the techniques described above in connection with FIG. 2. In the example of FIG. 3, the video content is parsed prior to initiation of playback (as occurring at STEP 72) such that a complete data file or manifest of detected key scene changes may be created and stored. In other embodiments, and as noted above, the video content may be parsed (e.g., continually or in segments) in sections or portions to detect key scene changes during playback.

Next, at STEP 72 of scene change-based search method 67, the playback device commences playback of the video content or continues video content playback in accordance with user commands received at the playback device. As previously indicated, the video content can be presented on a local display device (that is, a display device in physical proximity of the playback device) for viewing by an end user. In such instances, the display device may be integrated into the playback device (e.g., as in the case of a smartphone, tablet, laptop, smart television, or similar device having an integrated display screen) or, instead, may be a freestanding device to which the playback device is coupled via a wired or wireless connection. In other instances, the playback device may be a streaming server, such as a consumer place-shifting device residing in an end user's residence, place of work, or similar location. In this latter instance, the playback device may stream the video content over a network (e.g., network 22 shown in FIG. 1) to a second device (e.g., device 14) for playback on a display device (e.g., device 30) associated therewith. Additionally, in such embodiments, user search commands may be received at the second device (e.g., device 14) and transmitted over the network (e.g., network 22) to the place-shifting device (e.g., device 12) to initiate the smart search functions described herein.

As indicated in FIG. 3 at STEP 74 of scene change-based search method 67, certain interactive imagery may be generated on the screen of the display device to assist or support a user in utilizing the smart search functions described herein. Such imagery is referred to herein as "a smart search GUI," and can include various different graphical elements useful in visually conveying information to the end user pertinent to searching, such as a slide bar, a slide bar widget, scene change markers, and other such graphics. Additionally or alternatively, and as noted above, thumbnail imagery can be generated on the display screen (e.g., superimposed over the primary display image) when a user engages in the smart search processes. When displayed, such thumbnail imagery may include thumbnails depicting the key scene transitions in the video content, as previously discussed. In other embodiments, such a smart search GUI and other such graphics may not be produced during method 67.

Progressing to STEP 76 of scene change-based search method 67, the playback device (e.g., smart search module 56 shown in FIG. 2) monitors for the receipt of user search commands. At STEP 78, the playback device determines whether a user search command has been received at the playback device. If no such user search command has been received, the playback device determines whether termination of the present iteration of scene change-based search method 67 is appropriate (STEP 90); e.g., due to user input requesting the current video playback session is concluded. If this is the case, the playback device progresses to STEP 92 and terminates the present iteration of method 67. Otherwise, the playback device returns to STEP 72 of scene change-based search method 67 and continues the current playback session, while monitoring for user search commends (STEP 76) and performing the other process steps when appropriate and as previously described.

If a user search command has been received at STEP 78, the playback device advances to STEP 80 of scene change-based search method 67. At STEP 80 of method 67, the playback device ascertains the default search playback position corresponding to the newly-received user search command ($PP_{DS}$). In one approach, the playback device determines $PP_{DS}$ in a manner similar or identical to that traditionally employed in executing SKIP or SEEK functions. For example, in the case of a SKIP function, if a user has selected a forward SKIP button once (whether by selection via virtual button on a GUI, by pressing a button on a remote control, or in some other manner), the playback device may recall the fixed time jump associated with SKIP (e.g., 10 seconds) and determine that the default search playback position ($PP_{DS}$) is 10 seconds ahead of the current playback position. If the user has instead entered a SEEK command implemented utilizing a trick mode, the playback device may begin to advance the media content in a forward or backward time direction at an increased playback speed (e.g., 2×, 4×, 8×, or 16× the normal playback speed) in accordance with the user command. Finally, if the user has entered a SEEK command by manipulating a GUI widget, such as by moving a sliding widget or bug along the length of a slide bar, the playback device may translate this user input into the default search playback position ($PP_{DS}$) accordingly; e.g., observing the location of the sliding widget along the slide bar and converting this position into a corresponding time position for $PP_{DS}$.

Next, at STEP 82 of method 67, the playback device defines the parameters of the time window encompassing the default search playback position ($PP_{DS}$). As indicated above, such parameters may include a window start time ($W_S$) occurring X seconds prior to the default search playback position ($PP_{DS}$) and a window end time for the search window ($W_E$) occurring Y seconds after $PP_{DS}$. In certain instances, X and Y may have equivalent static values. In this case, the playback device may simply recall a duration of the time window (e.g., on the order of 2 to 10 seconds) from memory, while defining the parameters of the time window such that X and Y are equidistant from the default search playback position ($PP_{DS}$) as take along the time axis. As discussed above, the values of X and Y (and therefore the duration of the time window) will vary among embodiments, but will often be selected such that the sum of X and Y is greater than 2 seconds and less than 20 seconds. In other embodiments, X and Y may not be equivalent and/or may have dynamic values that vary depending factors relating to the search process, as discussed below. Finally, while in many cases the playback device will independently determine the values of X and Y (e.g., by recalling these values from local memory), this need not be the case in all implementations. For example, in implementations in which the playback device acts as a place-shifting device or a streaming video server (e.g., as discussed above in connection with device 12 shown in FIG. 1), the values of X and Y may be transmitted to the playback device, over a network (e.g., network 22), and from a second device (e.g., device 14 shown in FIG. 1) in conjunction with the user search command data utilized to control the place-shifting device.

In implementations in which X and Y have dynamic values, the values of X and Y may vary depending upon any number of factors. Such factors can include, for example, the time direction of the user search command. For example, in this case, the playback device may assign X a greater value than Y (e.g., X and Y may be assigned values of 3 and 2 seconds, respectively) if the default search playback position ($PP_{DS}$) occurs prior to the current playback position in the video content; that is, if a user is searching the video content in a backward time direction. Conversely, the playback device may assign Y a greater value than X (e.g., X and Y may be assigned values of 2 and 3 seconds, respectively) if the default search playback position ($PP_{DS}$) occurs after the current playback position in the video content; that is, if a user is searching the video content in a forward time direction. This, in effect, expands the time window in the direction time direction of the search action to further increase the likelihood of locating the point-of-interest sought by the end user.

In alternative embodiments, the values of X and Y may be varied based upon other characteristics related to the user search commands. For example, in instances in which the user search command is received as a SEEK function having a trick mode speed (e.g., to advance playback of the video content in a forward or backward time direction by 2×, 4×, 8×, or 16× the normal playback speed), the values of X and Y may be varied a function of the trick mode speed of the SEEK function; e.g., more specifically, the values of X and Y may be increased as the playback speed of the trick mode increases. In still other embodiments, the value of X and Y may be increased based upon recent search history. For example, if a user has repeatedly searched a segment of the video content and continues to search such video content in a short period of time (e.g., on the order of a few seconds), the value of X and Y may be increased to effectively widen or broaden the search and increase the likelihood of locating the point-of-interest sought by the end user. Such approaches may also be combined with any of the other approaches discussed above, as desired, to yield still further embodiments of the present disclosure.

Continuing to STEP 84 of scene change-based search method 67, the playback device next determines whether any key scene changes are located within the time window. Again, the playback device may render this determination utilizing the data indicating the time position of key scene changes, as generated by scene change detection module 52 and/or thumbnail generation module 54. If determining that at least one key scene change occurs within the time window, the playback device shifts or advances playback of the video content to a playback position corresponding to this key scene change (STEP 86). If multiple key scene changes occur within the time window, the playback device may shift to the playback position corresponding to the scene key change closest in time to $PP_{DS}$. In the rare instances that two key scene changes are equally close in time to $PP_{DS}$, playback device may shift the playback position to the key scene change occurring prior to $PP_{DS}$ if a user is searching in a backward time direction; or to the key scene change occurring after $PP_{DS}$ if a user is searching in a forward time direction. Otherwise, the playback device progresses to STEP 88 and shifts playback of the video content to the default search playback position ($PP_{DS}$). In this manner, the user is more likely to arrive precisely at a key scene change within a temporal field of interest, thereby enhancing the ease and convenience with which the user may locate desired points-of-interest in an intuitive manner. Lastly, at STEP 90 of method 67, the playback device determines whether the present iteration of smart, scene change-based search method 67 should terminate. If so, the playback device shifts to STEP 92 and terminates the current iteration of method 67. Alternatively, the playback device returns to STEP 74 and the above-described process steps repeat or loop.

FIGS. 4 and 5 illustrate two exemplary scenarios that may occur during the performance of method 67 in embodiments. Referring initially to the exemplary scenario shown in FIG. 4, the performance of a smart, scene-based SKIP or SEEK function is depicted. The present playback position is identified by arrow 92, while the playback position dictated by a traditional SKIP or SEEK function is identified by arrow 94. Here, the playback device has identified a key scene change at the playback position ($PP_{SC}$) identified by arrow 96. This key scene change is slightly prior to (e.g., a second or so before) the default time position of the user search command ($PP_{DS}$), as identified by arrow 94. Further, this time position ($PP_{SC}$) is located within the time window represented in FIG. 4 by graphic 97. Accordingly, the playback device shifts playback of the video content to the playback position ($PP_{SC}$) corresponding to the detected key scene change. Stated differently, the playback device latches to the key scene change identified by arrow 96 in this instances, thereby ensuring that the user does not inadvertently advance playback of the video content past the key scene change as would otherwise occur if playback was automatically advanced to the default search time position ($PP_{DS}$) identified by arrow 94.

Similarly, in FIG. 5, an example of a smart, scene change-based SKIP or SEEK function is presented. As was previously the case, arrow 92 identifies the current playback position of the video content, while arrow 94 identifies the time position to which a traditional SKIP or SEEK function might shift playback; e.g., N seconds ahead of the current playback position, with N typically having a value on the order of 10 seconds or so. In this case, the playback device assesses whether a key scene change is detected near (within the temporal window) of default SKIP or SEEK position and, if so, latches to the key scene change. Stated differently, if locating a key scene change in the temporal window encompassing the default SKIP or SEEK position (represented by graphic 97 in FIG. 5), the playback device shifts the playback position to a time position corresponding to the key scene change rather than the default SKIP or SEEK position, as previously described.

As shown in FIGS. 4-5, various other graphics or user interface elements can be produced alongside the graphics associated with the smart search functions. Such other graphics can include, for example, key scene change markers 102, interface elements 104 (e.g., a virtual slider or widget) for activating or deactivating the smart search feature, and interface element 106 (e.g., a virtual button) for summoning a menu to adjust other parameters pertaining to the smart search function; e.g., to adjust the duration of the time window, to hide or show markers 102, to specify a particular type of scene change or sensitivity setting to be considered in identifying key scene changes, or the like. For example, when a sensitivity setting is provided, as the value of the sensitivity setting is increased, scene change detection module 52 may increase its propensity to identify key scene changes in the video content. This may be accomplished by lowering the threshold for defining a key scene change in video content when module 52 applies image processing; or, if other data is provided regarding the scene changes (e.g., if closed captioning or embedded flags provide a hierarchy, weighting, or other priority ranking of the scene changes), module 52 may exclude scene changes having lower priority rankings when identifying key scene changes. In further embodiments, key scene change markers 102 may be given another appearance, such as bars positioned along slide bar graphic 108 (FIGS. 4 and 5) and generated in a striking color (e.g., red). Additionally, thumbnails can be generated in place of key scene change markers 102 or may otherwise be generated alongside slide bar graphic 108 in further embodiments.

CONCLUSION

The foregoing has thus provide systems, methods, and playback devices enabling smart search or scene change-based search functionalities utilizing key scene changes in video content. By predicting user desires, embodiments of the disclosure provide an efficient scheme to better enable users to navigate through video content by searching (SKIPPING or SEEKING) to the time locations corresponding to scene changes in the video content. The above-described systems, methods, and playback devices can increase search accuracy in most instances by better predicting user viewing desires and then tailoring the search action in accordance with such predictions. Further, implementation of the above-described playback device and method requires little additional effort or learning on behalf of the end user in executing the smart search functions.

While several exemplary embodiments have been presented in the foregoing Detailed Description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method of playing video content utilizing a playback device, the method comprising:
   receiving a user command at the playback device to shift a current playback position of the video content to a default search playback position ($PP_{DS}$);
   defining a temporal window extending before and after the default search playback position ($PP_{DS}$) of the user command,
      wherein a start time of the temporal window is determined by subtracting a first duration from the default search playback position ($PP_{DS}$),
      wherein an end time of the temporal window is determined by adding a second duration to the default search playback position ($PP_{DS}$), and
      wherein the temporal window extending before and after the default search playback position ($PP_{DS}$) encompasses a segment of the video content;
   searching the segment of the video content encompassed by the temporal window extending before and after the default search playback position ($PP_{DS}$) for a scene change; and
   in response to locating the scene change in the segment of the video content encompassed by the temporal window, automatically shifting playback of the video content to a new playback position corresponding to a time position of the scene change ($PP_{ST}$) between the start time of the temporal window and the end time of the temporal window.

2. The method of claim 1, further comprising, in response to the scene change near to the temporal window, shifting playback of the video content to the new playback position corresponding to the time position of the scene change ($PP_{ST}$) rather than the default search playback position ($PP_{DS}$).

3. The method of claim 2, further comprising, in response to multiple scene changes being located within the temporal window, shifting playback of the video content to the new playback position corresponding to the scene change closest in time to the default search playback position ($PP_{DS}$).

4. The method of claim 3, further comprising:
   in response to receipt of the user command, searching a time window encompassing the default search playback position ($PP_{DS}$) for the scene change in the video content wherein the time window is a different window than the temporal window.

5. The method of claim 4, further comprising:
   in response to the default search playback position ($PP_{DS}$) occurring after the current playback position in the video content, assigning a first predetermined value to the first duration; and
   in response to the default search playback position ($PP_{DS}$) occurs occurring prior to the current playback position in the video content, assigning a second predetermined value to the first duration.

6. The method of claim 5, wherein the user command comprises instructions to implement a SEEK function having a trick mode speed; and
   wherein the method further comprises determining the first duration and second duration based, at least in part, on the trick mode speed of the SEEK function.

7. The method of claim 3, further comprising:
   place-shifting the video content from the playback device, over a network, and to a second device coupled to a display device;
   wherein the user command is entered at the second device and sent as a user command message transmitted from the second device, over the network, and to the playback device.

8. The method of claim 6, further comprising:
   extracting the start time ($W_S$) of the temporal window and the end time ($W_E$) of the temporal window from a user command message.

9. The method of claim 1, further comprising:
   parsing the video content to identify scene changes to generate scene change data prior to playback of the video content; and
   subsequently utilizing the scene change data to determine whether the scene change is located within the temporal window.

10. The method of claim 9, further comprising:
    generating a slide bar graphic on a display device including a slide bar representative of a duration of the video content; and
    further producing, on the display device, markers adjacent to the slide bar graphic denoting locations of scene changes indicated by the scene change data.

11. The method of claim 10, further comprising:
    generating thumbnails for the video content at junctures corresponding to scene changes listed in the scene change data; and
    in response to user input, displaying selected ones of the thumbnails alongside the slide bar graphic.

12. The method of claim 9 wherein parsing comprises identifying the scene changes based, at least in part, on user preference data stored in a memory of the playback device.

13. The method of claim 12 wherein the user preference data specifies a sensitivity for generating the scene change data.

14. The method of claim 1, wherein the second duration between the end time of the temporal window and the default search playback position ($PP_{DS}$) is dynamically determined based on a search direction.

15. The method of claim 1, wherein the second duration between the end time of the temporal window and the default search playback position ($PP_{DS}$) is between 1 second and 10 seconds.

16. A playback device, comprising:
    a processor; and
    a computer-readable storage medium storing computer-readable code that, when executed by the processor, causes the playback device to perform operations comprising:

receiving a user command at the playback device to shift a current playback position of video content to a default search playback position ($PP_{DS}$);

defining a temporal window extending before and after the default search playback position ($PP_{DS}$) of the user command, wherein a start time of the temporal window is defined by subtracting a first duration from the default search playback position ($PP_{DS}$), wherein an end time of the temporal window is identified by adding a second duration to the default search playback position ($PP_{DS}$), and wherein the temporal window extending before and after the default search playback position ($PP_{DS}$) encompasses a segment of the video content;

searching the segment of the video content encompassed by the temporal window for a scene change between the start time and the end time of the temporal window; and in response to locating the scene change in the segment of video encompassed by the temporal window, automatically shifting playback of the video content to a new playback position corresponding to the scene change ($PP_{ST}$).

17. The playback device of claim 16 wherein the operations further comprise:

in response to locating multiple scene changes within the temporal window or near to the temporal window, shifting playback of the video content to the new playback position corresponding to the scene change closest in time location to the default search playback position ($PP_{DS}$).

18. The playback device of claim 16 wherein the operations further comprise:

parsing the video content to identify scene changes to generate scene change data prior to playback of the video content; and using the scene change data to determine whether the scene change is located within the temporal window or to determine whether the scene change is located near the temporal window.

19. A playback device, comprising:

a scene change detector configured to:

detect scene changes in video content in a time window and in a temporal window, wherein the time window is different than the temporal window; and generate scene change data indicating locations of the scene changes in the video content, wherein the scene change data is provided as a manifest; and a smart search controller to:

monitor for a user command to shift a current playback position of the video content to a default search playback position ($PP_{DS}$);

define the temporal window extending before and after the default search playback position ($PP_{DS}$) of the user command, wherein a start time of the temporal window is defined by subtracting a first duration from the default search playback position ($PP_{DS}$), wherein an end time of the temporal window is defined by adding a second duration to the default search playback position ($PP_{DS}$), and wherein the temporal window extending before and after the default search playback position ($PP_{DS}$) encompasses a segment of the video content;

utilize the scene change data to determine a scene change occurs in the segment of the video content encompassed by the temporal window; and in response to determining that the scene change occurs in the segment of video encompassed by the temporal window, automatically shifting playback of the video content to a playback position corresponding to the scene change ($PP_{ST}$).

20. The playback device of claim 19 further comprising a thumbnail generator configured to:

receive the scene change data from the scene change detector; and generate thumbnail images for each time position in the video content at which the scene change data indicates that an occurrence of the scene change ($PP_{ST}$) wherein the scene change detector is configured to detect scene changes in the video content utilizing scene change markers embedded in the video content.

* * * * *